(12) United States Patent
De La Fuente Sanchez

(10) Patent No.: US 12,404,691 B2
(45) Date of Patent: Sep. 2, 2025

(54) SOLAR ENERGY CONVERSION SPHERICAL DOME

(71) Applicant: Alfonso Fabian De La Fuente Sanchez, Saanich (CA)

(72) Inventor: Alfonso Fabian De La Fuente Sanchez, Saanich (CA)

( * ) Notice: Subject to any disclaimer, the term of this patent is extended or adjusted under 35 U.S.C. 154(b) by 608 days.

(21) Appl. No.: 17/878,815

(22) Filed: Aug. 1, 2022

(65) Prior Publication Data

US 2023/0039628 A1 Feb. 9, 2023

Related U.S. Application Data

(60) Provisional application No. 63/228,836, filed on Aug. 3, 2021.

(51) Int. Cl.
*E04H 15/02* (2006.01)
*E04H 15/54* (2006.01)
*H02J 7/35* (2006.01)

(52) U.S. Cl.
CPC ............. *E04H 15/02* (2013.01); *E04H 15/54* (2013.01); *H02J 7/35* (2013.01); *B60L 2200/20* (2013.01)

(58) Field of Classification Search
CPC .. E04H 15/02; E04H 15/54; H02J 7/35; H02J 2300/24; H02J 4/00; B60L 2200/20; H02S 10/40; H02S 30/20; H02S 40/34; H02S 20/30; Y02T 10/70; Y02T 10/7072

USPC .......................................................... 320/101
See application file for complete search history.

(56) References Cited

U.S. PATENT DOCUMENTS

| | | | |
|---|---|---|---|
| 10,396,704 B2 | 8/2019 | Goodman | |
| 11,083,259 B2 | 8/2021 | Akin | |
| 11,203,279 B1 | 12/2021 | Tatro | |
| 11,225,187 B1 | 1/2022 | Koehler | |
| 2006/0198122 A1* | 9/2006 | Senter | A42B 1/244 362/105 |
| 2009/0038241 A1* | 2/2009 | Chen | H10F 77/1696 52/173.3 |
| 2011/0167716 A1* | 7/2011 | Myntti | F24S 90/00 47/17 |
| 2015/0155822 A1* | 6/2015 | Feng | H02S 20/26 136/259 |
| 2016/0215941 A1* | 7/2016 | Salzinger | F21L 4/08 |
| 2017/0201205 A1* | 7/2017 | Gaston | H02S 20/25 |
| 2022/0256778 A1* | 8/2022 | Santiago | A01G 9/227 |

* cited by examiner

*Primary Examiner* — Paul Dinh
(74) *Attorney, Agent, or Firm* — Baumgartner Patent Law, LLC; Marc Baumgartner

(57) ABSTRACT

A solar energy conversion system is provided, the solar energy conversion system comprising a spherical dome which is composed of a material, a multiplicity of solar cells attached to an outer surface of the material, an energy collection system which is housed within the spherical dome and is in electrical communication with the multiplicity of solar cells, an energy storage unit which is housed within the spherical dome and is electrical communication with the electrical collection system, and a power output port, which is in electrical communication with the energy storage unit.

8 Claims, 4 Drawing Sheets

SOLAR ENERGY CONVERSION SPHERICAL DOME

CROSS REFERENCE TO RELATED APPLICATIONS

This application claims priority to U.S. Patent Application Ser. No. 63/228,836 filed Aug. 3, 2021, entitled SOLAR COLLECTOR. The above-identified priority patent application is incorporated herein by reference in its entirety.

FIELD

The present technology is directed to a structure that is used to improve the capture of solar radiation. More specifically, it is a dome with solar panels and an electrical system which is for electrical communication with batteries on devices such as electric scooters.

BACKGROUND

A solar cell, or photovoltaic cell, is an electrical device that converts the energy of light directly into electricity by the photovoltaic effect, which is a physical and chemical phenomenon. It is a form of photoelectric cell, defined as a device whose electrical characteristics, such as current, voltage, or resistance, vary when exposed to light. Individual solar cell devices are often the electrical building blocks of photovoltaic modules, known colloquially as solar panels. The common single junction silicon solar cell can produce a maximum open-circuit voltage of approximately 0.5 to 0.6 volts. Solar cells are described as being photovoltaic, irrespective of whether the source is sunlight or an artificial light. In addition to producing energy, they can be used as a photodetector (for example infrared detectors), detecting light or other electromagnetic radiation near the visible range, or measuring light intensity. The operation of a photovoltaic (PV) cell requires three basic attributes. First, the absorption of light, generating either electron-hole pairs or excitons. Second, the separation of charge carriers of opposite types. Third, is the separate extraction of those carriers to an external circuit.

A perovskite solar cell (PSC) is a type of solar cell which includes a perovskite-structured compound, most commonly a hybrid organic-inorganic lead or tin halide-based material, as the light-harvesting active layer. Perovskite materials, such as methylammonium lead halides and all-inorganic caesium lead halides, are inexpensive to produce and simple to manufacture.

Flat solar panels need to face the sun in order to capture sunlight. Use of such panels on solar powered electric vehicles limits the capture of solar radiation and requires that they be parked outside.

What is needed is an improved solar radiation capture system that allows for transfer of electricity from the system to rechargeable vehicles. It would be preferable if the vehicles could be transiently stored in a structure which is part of the system or could be parked close to the structure. It would be preferable if the structure was a dome. It would be further preferable if the dome retained the remainder of the system.

SUMMARY

The present technology is directed to an improved solar radiation capture system that allows for transfer of electricity from the system to rechargeable vehicles. The vehicles can be transiently stored in a structure which is part of the system or can be parked close to the structure. The structure is a dome. The dome retains the remainder of the system.

The technology is a spherical dome that captures the sun's energy, and due to its dome-like shape, it is able to do so regardless of the position of the sun. It captures the sun's rays from many angles, as there are solar modules all around the spherical dome.

In one embodiment, a solar energy conversion system is provided, the solar energy conversion system comprising a spherical dome which is composed of a material, a multiplicity of solar cells attached to an outer surface of the material, an energy collection system which is housed within the spherical dome and is in electrical communication with the multiplicity of solar cells, an energy storage unit which is housed within the spherical dome and is electrical communication with the electrical collection system, and a power output port, which is in electrical communication with the energy storage unit.

In the solar energy conversion system, the solar cells may be flexible and mouldable to the shape of the spherical dome.

In the solar energy conversion system, the material may be flexible.

In the solar energy conversion system, the material may be translucent.

In the solar energy conversion system, the power output port may be a universal serial bus.

In another embodiment, a method of charging an electrically powered vehicle is provided, the method comprising selecting a solar energy conversion system, the solar energy conversion system comprising a spherical dome which is composed of a material, a multiplicity of solar cells attached to an outer surface of the material, an energy collection system which is housed within the spherical dome and is in electrical communication with the multiplicity of solar cells, an energy storage unit which is housed within the spherical dome and is electrical communication with the electrical collection system, and a power output port, which is in electrical communication with the energy storage unit; and plugging a power connector for the electrically powered vehicle into the power output port, thereby charging the electrically powered vehicle.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
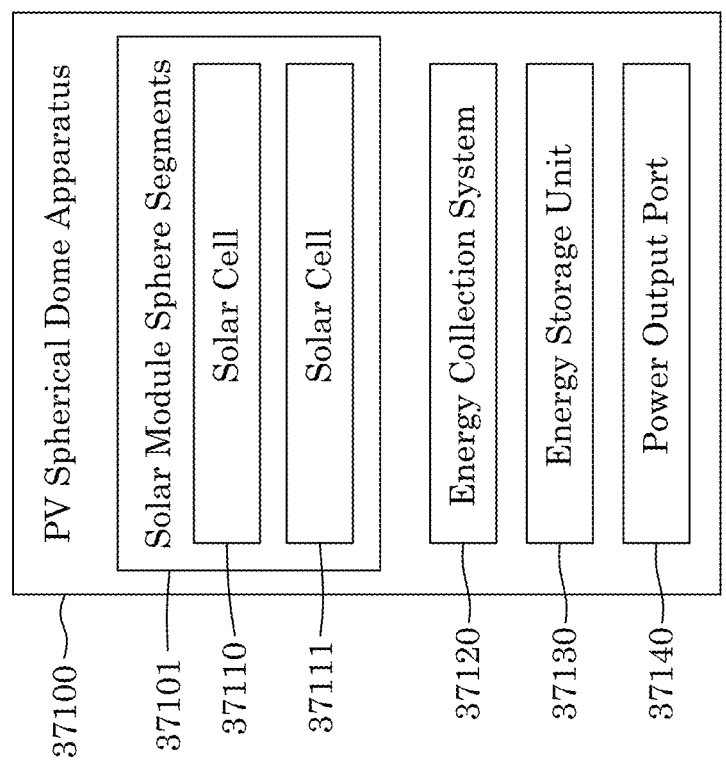
FIG. 1 is a block diagram of the solar energy conversion system of the present technology.

FIG. 1 is a diagram of the solar energy conversion system, generally referred to as 10. A photovoltaic spherical dome (37100) comprises multiple solar modules (37101), each comprising two or more solar cells (37110, 37111). The solar modules (37101) are connected to an energy collection system (37120) located on the inside of the spherical dome (37100). An energy storage unit (37130) located on the inside of the spherical dome (37100), wherein the energy storage unit (37130) is for example, but not limited to, a battery or a plurality of energy cells. The energy storage unit 37130 is in electrical communication with the energy collection system (37120). A power output port (37140) is located in the bottom of the photovoltaic spherical dome (37100) and is in electrical communication with the energy storage unit (37130). One familiar with the art will appreciate that the output port (37140) can also be located in other areas of the photovoltaic spherical dome (37100).

Figure 2:
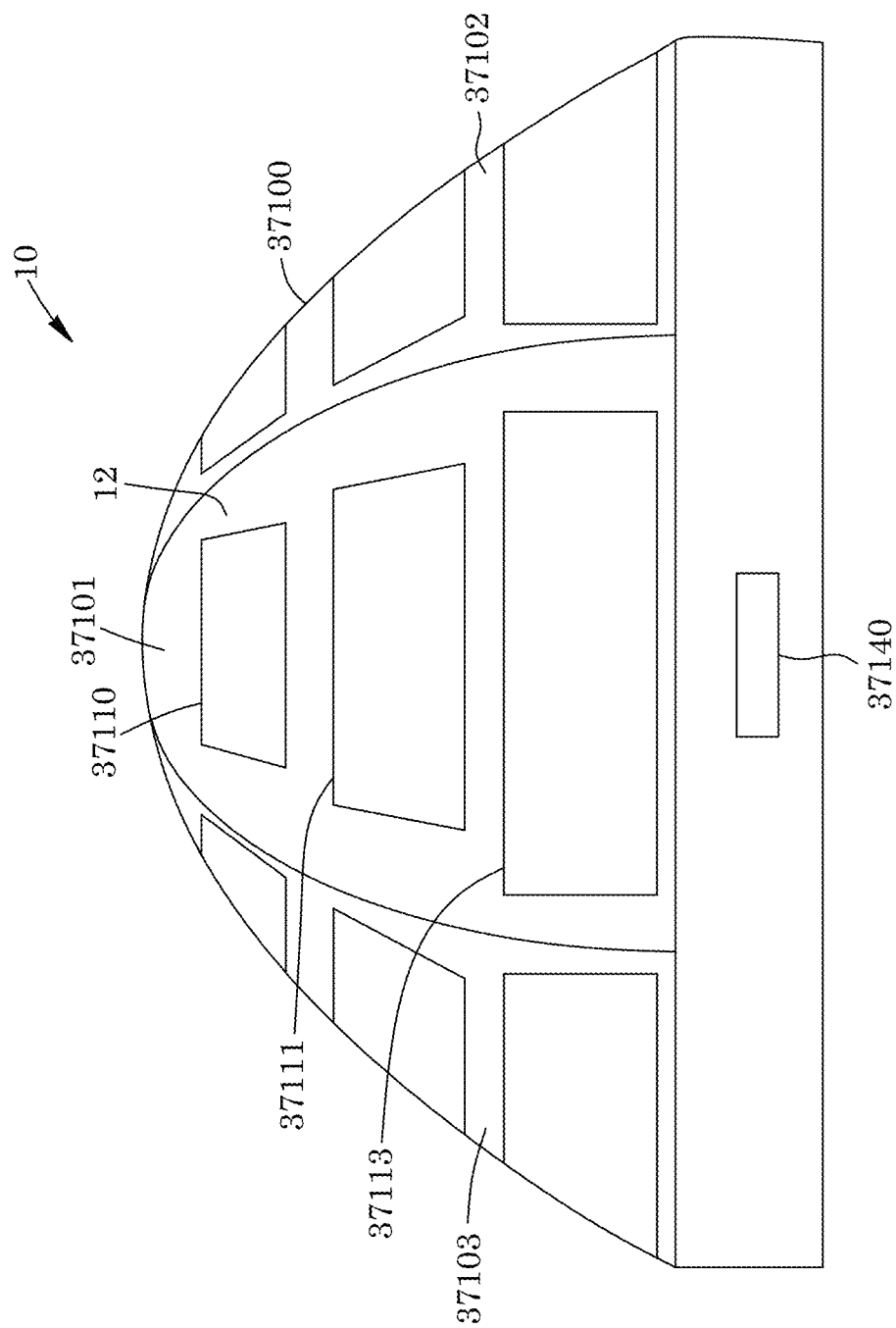
FIG. 2 is a side view of the photovoltaic spherical dome.

FIG. 2 is a side view of an alternative embodiment photovoltaic spherical dome (37100) comprising three solar modules (37101, 37102, 37103), where each solar module, for example module 37101 comprises two or more solar cells (37110, 37111) attached to the outer side of the spherical dome (37100), wherein each solar cell (37110, 37111) captures energy coming from different angles; wherein each solar cell (37110, 37111) is independent of the rest of the solar cells and is independently connected to an energy collection system (37120), which in turn is connected to an energy storage unit (37130). One familiar with the art will appreciate that by having each cell independently connected to an energy collection system (37120) and an energy storage unit (37130), the solar module (37101) is not restricted to the amount of power the combined sum of all energy the solar modules produce.

The solar modules (37101) are mounted on the material 12 of the spherical dome (37100). In one embodiment the material 12 is a waterproof fabric. In another embodiment, the material 12 is a flexible plastic polymer. In yet another embodiment, the material is an inflexible material. In one embodiment the material 12 is translucent.

A power output port (37140) is in the form of a universal serial bus (USB) connector. In an alternative embodiment of the technology, the power output port (37140) is a power connector or a power outlet.

Figure 3:
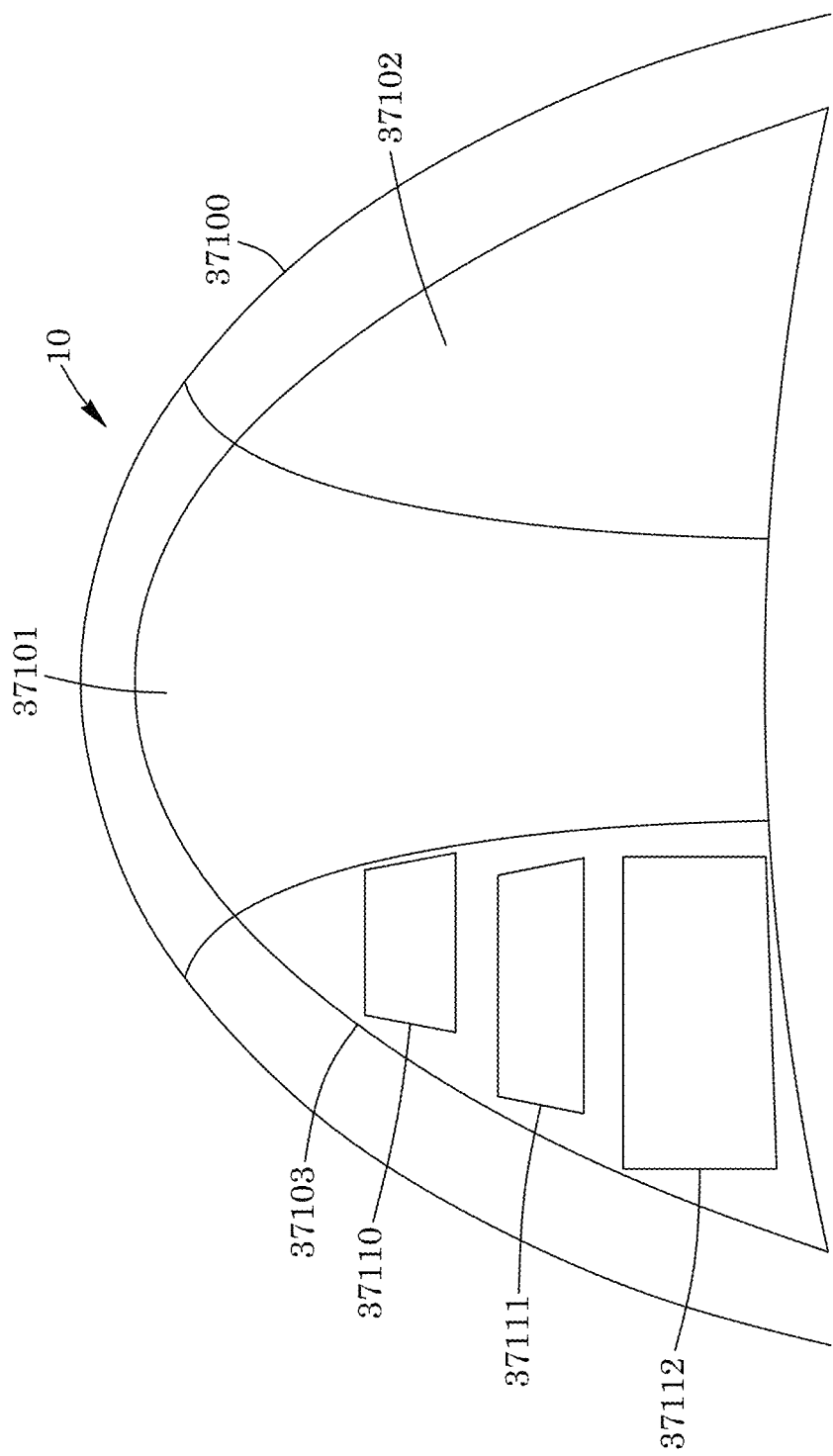
FIG. 3 is a cross sectional view of the photovoltaic spherical dome.

FIG. 3 is a cross sectional view of the spherical dome (37100) showing how the solar cells (37110, 37111, 37112) are flexible and mouldable (can bend) to the shape of the segment of the spherical dome. This allows for maximum solar energy consumption, regardless of the position of the sun.

One familiar with the art will appreciate that if the spherical dome is large enough, it could be installed as part of a rooftop, thus, allowing natural light in while collecting solar energy.

Figure 4:
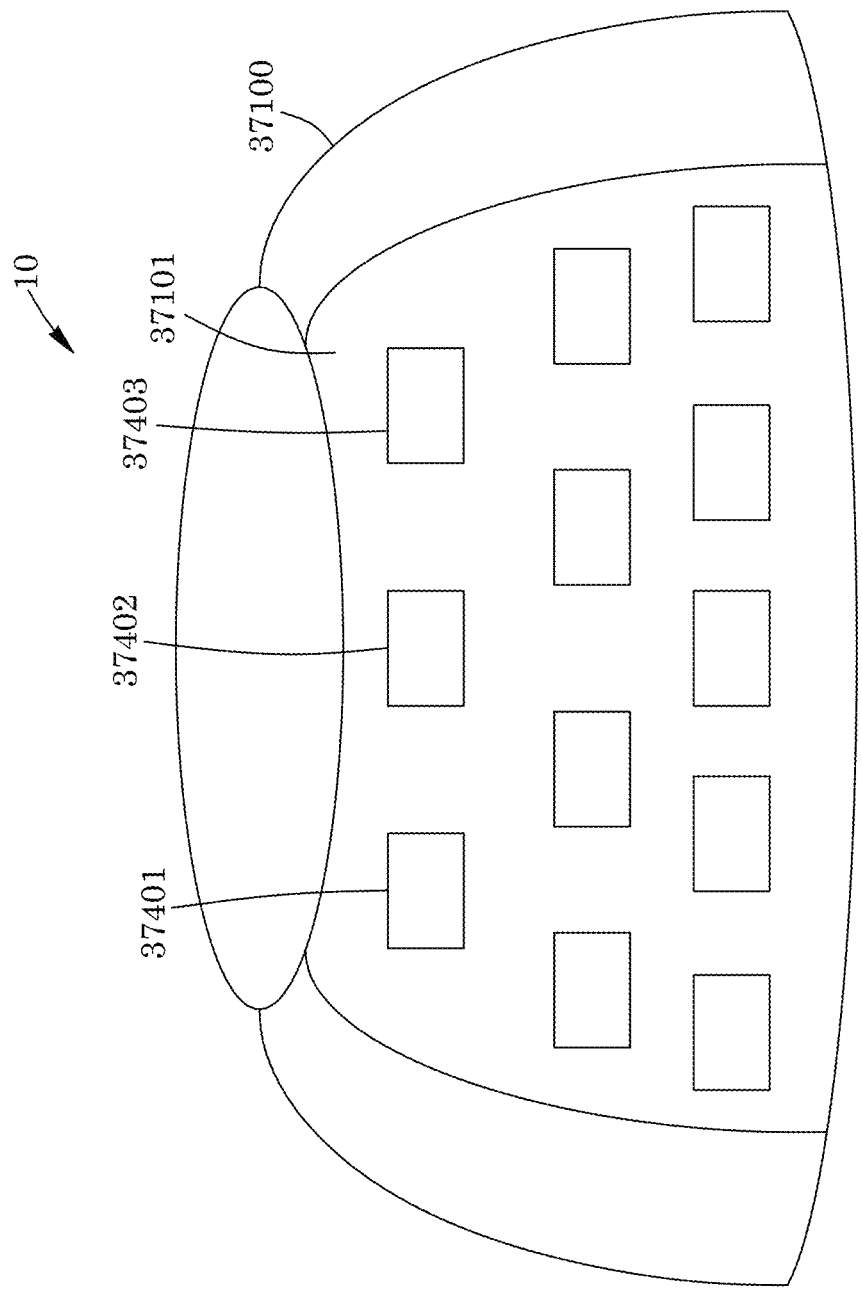
FIG. 4 shows an alternative embodiment of the photovoltaic spherical dome.

FIG. 4 shows an alternative embodiment of the technology in which the spherical dome (37100) is modified to a truncated spherical dome (37100). It comprises solar cells (37401, 37402, 37403) attached to the material of the spherical dome (37100).

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A solar energy conversion system, the solar energy conversion system comprising: a spherical dome which is composed of a material which is translucent and is configured to transiently store a rechargeable vehicle while being charged; a multiplicity of flexible solar cells attached to an outer surface of the material; an energy collection system which is housed within the spherical dome and is in electrical communication with the multiplicity of flexible solar cells; an energy storage unit which is housed within the spherical dome and is electrical communication with the energy collection system; and a power output port, which is in electrical communication with the energy storage unit.

2. The solar energy conversion system of claim 1, wherein the solar cells are mouldable to the shape of the spherical dome.

3. The solar energy conversion system of claim 2, wherein the material is flexible.

4. The solar energy conversion system of claim 3, wherein the material is a flexible plastic polymer.

5. The solar energy conversion system of claim 4, wherein the power output port is a universal serial bus.

6. A method of charging an electrically powered vehicle, the method comprising: selecting a solar energy conversion system, the solar energy conversion system comprising: a spherical dome which is composed of a material which is translucent; a multiplicity of flexible solar cells attached to an outer surface of the material; an energy collection system which is housed within the spherical dome and is in electrical communication with the multiplicity of flexible solar cells; an energy storage unit which is housed within the spherical dome and is electrical communication with the energy collection system; and a power output port, which is in electrical communication with the energy storage unit; transiently storing the electrically powered vehicle in the spherical dome; and plugging a power connector for the electrically powered vehicle into the power output port, thereby charging the electrically powered vehicle.

7. The solar energy conversion system of claim 1, wherein each solar cell of the multiplicity of solar cells is independently connected to the energy collection system.

8. A method of charging an electrically powered vehicle, the method comprising: selecting a solar energy conversion system, the solar energy conversion system comprising: a spherical dome which is composed of a material which is translucent; a multiplicity of flexible solar cells attached to an outer surface of the material; an energy collection system which is housed within the spherical dome and is in electrical communication with the multiplicity of flexible solar cells; an energy storage unit which is housed within the spherical dome and is electrical communication with the energy collection system; and a power output port, which is in electrical communication with the energy storage unit; moving the electrically powered vehicle into the spherical dome; and plugging a power connector for the electrically powered vehicle into the power output port, thereby charging the electrically powered vehicle.

* * * * *